(No Model.)
T. McHUGH.
COUPLING FOR WATER CLOSET BOWLS.
No. 343,138. Patented June 1, 1886.
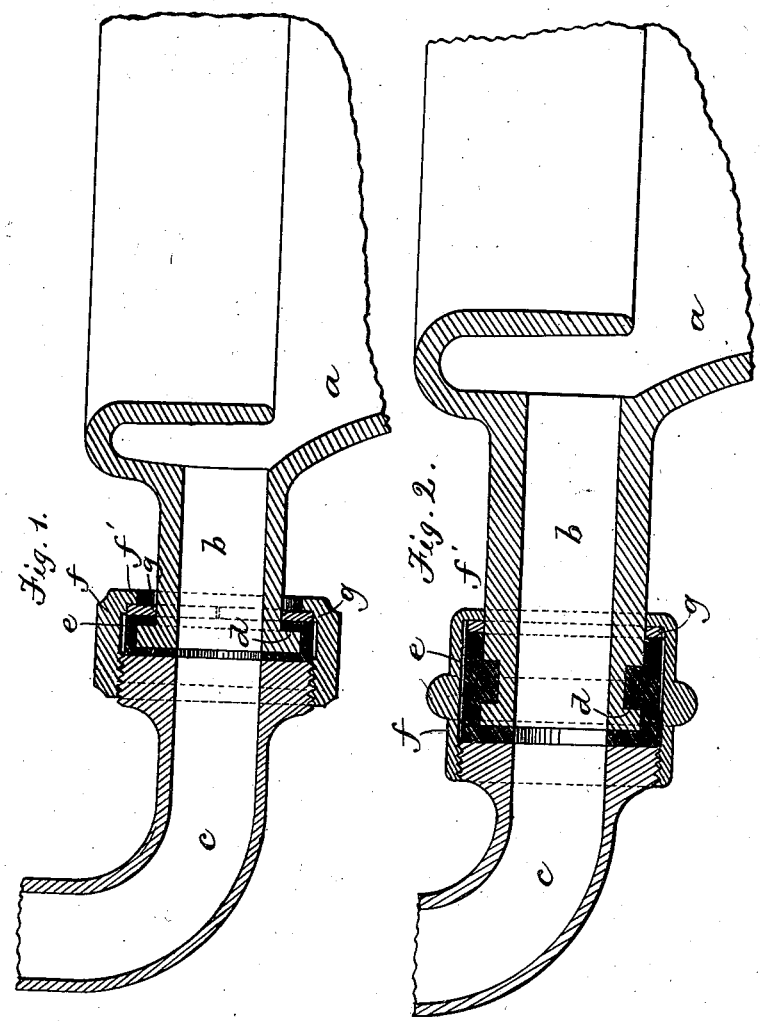

UNITED STATES PATENT OFFICE.

TIMOTHY McHUGH, OF BOSTON, MASSACHUSETTS, ASSIGNOR OF ONE-HALF TO WARD & CURLEY, OF SAME PLACE.

COUPLING FOR WATER-CLOSET BOWLS.

SPECIFICATION forming part of Letters Patent No. 343,138, dated June 1, 1886.

Application filed October 12, 1885. Serial No. 179,670. (No model.)

*To all whom it may concern:*

Be it known that I, TIMOTHY MCHUGH, of Boston, in the county of Suffolk and State of Massachusetts, have invented certain new and useful Improvements in Couplings for Water-Closet Bowls, of which the following is a specification.

This invention has for its object to enable a metal pipe to be quickly and firmly connected to the tubular neck of a water-closet bowl, and at the same time provide against all danger of breaking the parts; and it consists in the combination, with said neck, having at its outer end a shoulder, of a rubber ring formed to cover the shoulder and the end of the neck, a pipe formed to bear against the end of the ring that covers the end of the neck, and a coupling-nut formed to engage said pipe, and having a flange which bears either against the end of the rubber ring that covers the shoulder on the neck and the periphery of the neck, between said end and shoulder, or against a loose ring interposed between the flange and ring, all of which I will now proceed to describe.

Of the accompanying drawings, forming a part of this specification, Figure 1 represents a sectional view of a part of a water-closet bowl and the pipe connected thereto by my improved devices. Fig. 2 represents a similar view of a modification. Figs. 3 and 4 represent details.

The same letters of reference indicate the same parts in all the figures.

In the drawings, $a$ represents a water-closet bowl, and $b$ the tubular neck near the upper edge of the bowl, through which the water enters to flush the bowl, a water-pipe, $c$, being coupled to said neck.

In carrying out my invention I provide the outer end of the neck with a shoulder, $d$, which may be the inner side of a flange projecting outwardly from the neck, as shown in Fig. 1, or one edge of a groove formed in the neck, as shown in Fig. 2.

$e$ represents a ring of yielding rubber, formed to cover both the outer end of the neck and the shoulder $d$.

$f$ represents a coupling-nut, which is formed to engage with the threaded end of the pipe $c$, and has a flange, $f'$, projecting inwardly behind the inner edge of the rubber ring.

I prefer to interpose between the flange $f'$ and the rubber ring a loose ring, $g$, of metal, so that the rotation of the nut is not attended with so much friction as it would be if the flange bore directly on the rubber ring, and danger of breaking the neck $b$ by torsional strain is avoided.

In the construction shown in Fig. 1 the internal diameter of the flange $f$ is greater than that of the flange on the neck $b$, to enable the nut $f$ to be passed over said flange, and the ring $g$ is divided into two parts, as shown in Fig. 3; or it may be otherwise suitably constructed to enable it to be placed on the neck $b$, the internal diameter of the ring $g$ being such that it fits the body of the neck somewhat closely.

It will be observed that the rubber ring, engaged, as shown, with the neck so that it cannot be displaced by pressure exerted lengthwise of the neck, constitutes a collar which is engaged with the neck by its own elasticity, and supports the coupling-nut $f$, and also a packing which is compressed between the end of the neck $b$ and the pipe $c$, and insures a tight joint by merely turning up the coupling-nut with the hand. Thus the construction of rubber ring and its relationship to the other parts of the invention are such as to make it serve not only as a packing-ring or washer, as is common in couplings of this character, but also as a cushion to the several parts, whereby all danger of breaking the neck of the bowl by torsional strain in the act of coupling the parts is avoided.

I am aware that it is old and common to employ rubber in the form of rings or washers in the construction of couplings, and I do not claim this, broadly, confining my invention to the construction and arrangement of the parts pointed out in the claims, for the purposes stated.

The parts are few and simple, and therefore inexpensive and not liable to get out of order.

I claim—

1. The combination of the neck $b$, having a shoulder, $d$, a rubber packing-ring formed to cover both the end of the neck and the shoulder $d$ and the periphery of the neck between said end and shoulder, a pipe, $c$, having an externally-screw-threaded end formed to bear against the upper ring, and a coupling-nut formed to engage the threaded portion of the pipe $c$, and having a flange between which and the shoulder $d$ the rubber ring is clamped, as set forth.

2. The combination of the neck $b$, having a shoulder, $d$, the rubber packing-ring $e$, formed to cover both the end of the neck and the shoulder and the periphery of the neck between said end and shoulder, the threaded pipe $c$, the coupling-nut $f$, having a flange, $f'$, and the loose metal ring interposed between the flange $f$ and the ring $e$, as set forth.

3. The combination of the neck $b$, having a flange at its outer end, the rear side of which forms a shoulder, $d$, the rubber ring $e$, formed to cover the end of the neck and its flange, the threaded pipe $c$, the coupling-nut $f$, the flange $f'$, formed to pass over the flange of the neck, and the divided loose ring interposed between the flange $f'$ and ring $e$, and having a smaller internal diameter than the flange, so as to have an extended bearing on the ring $e$, as set forth.

In testimony whereof I have signed my name to this specification, in the presence of two subscribing witnesses, this 10th day of October, 1885.

TIMOTHY McHUGH.

Witnesses:
  C. F. BROWN,
  H. BROWN.